Feb. 8, 1938.  H. IRWIN  2,107,737
MULTIPLE LOCKING MEANS FOR AUTOMOBILE DOORS
Filed May 19, 1936
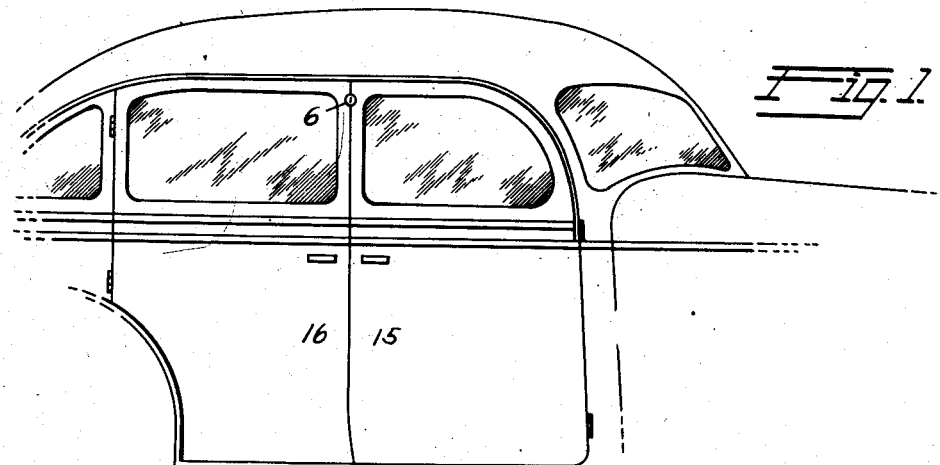
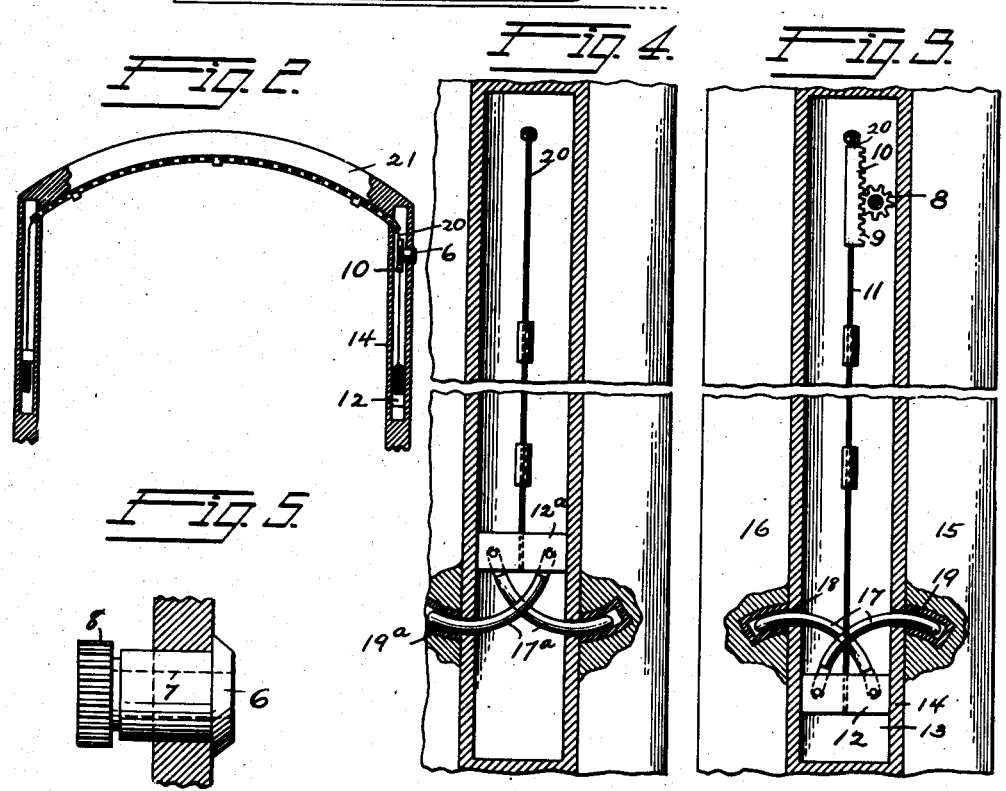
Inventor
Haskell Irwin.
By Samuel Herrick
Attorney Patented Feb. 8, 1938

2,107,737

UNITED STATES PATENT OFFICE 2,107,737

MULTIPLE LOCKING MEANS FOR AUTOMOBILE DOORS

Haskell Irwin, Oklahoma City, Okla.

Application May 19, 1936, Serial No. 80,623

1 Claim. (Cl. 70—264)

This invention relates to multiple locking means for automobile doors of the character of that shown in my co-pending application 66,097, filed February 27, 1936, now matured into Pat. No. 2,079,018, dated May 4, 1937.

The object of the invention is to provide a very simple and inexpensive means through the medium of which all of the doors of an automobile may be simultaneously locked or unlocked under control of a single manually operable member, such as a key, for example.

It is a further object of the invention to provide a device of this character which cannot readily be unlocked from the interior of the car body, so that even if a thief should break a window and get access to the interior of a car, he could not reach in and unlock the car doors. Further objects and advantages of the invention will be set forth in the detailed description which now follows.

In the accompanying drawing:

Figure 1 is a fragmentary perspective view of an automobile body having the device of the present invention applied thereto;

Fig. 2 is a transverse sectional view of the automobile body illustrating one of its top bows and the locking means associated therewith;

Fig. 3 is a transverse sectional view illustrating the locking means at one side of the car body;

Fig. 4 is a like view illustrating the locking means at the opposite side of the car body, and Fig. 5 is a detail view of the lock controlled pinion, hereinafter described.

Like numerals designate corresponding parts throughout the several figures of the drawing.

In the particular form of the invention which I have chosen for purposes of illustration, a conventional form of key controlled cylinder lock 6 carries upon the inner end of its rotative part 7, a spur gear 8. Partial rotation of the gear occurs when the key (not shown) is turned in the lock.

The gear meshes with the teeth 9 of a vertical rack bar 10. The lower end of this rack bar is connected, through the medium of a connecting rod or cable 11, with a block 12. The rack bar and block are movable vertically in a hollow portion 13 of the meeting post 14, which constitutes a part of the car frame and is the member against which the free edges of the front doors 15 and rear doors 16 abut when said doors are closed.

The block 12 has two curved bolts 17 pivotally connected thereto in such manner that as the block is drawn upwardly by the movement of the rack bar, said bolts will be projected outwardly, sliding through guide openings 18 of the post 14 and entering keepers 19 of the front and rear doors at one side of the car body.

A Bowden or other type of flexible wire 20 is connected to the upper end of the rack bar and its sheath is suitably supported along a top bow 21 of the car body. At the far side of the car, the said wire is attached to a block 12ª, which corresponds to the block 12 in that it has a pair of curved bolts 17ª pivotally connected thereto, which bolts lie in crossed relation to each other, as shown, and the free ends of which enter keepers 19ª of the front and rear doors at said far side of the car body.

However, it will be observed that whereas the curved bolts are at the upper side of the block 12 they are at the lower side of the block 12ª, so that they will function upon downward movement of said block. By virtue of this arrangement, the locks upon one side of the car body function upon a downward movement of the rack bar at the same time that the bolts upon the opposite side are functioning upon upward movement of said rack bar.

In other words, when the rack bar moves downwardly and block 12 is thrust downwardly, the bolts 17 will be withdrawn from the keepers 19. This same movement will cause the rack bar to draw upon the Bowden wire 20 and elevate block 12ª. It is clear that this will result in withdrawing bolts 17ª from the keepers.

Reverse movement of the rack bar will result in simultaneously locking the doors upon both sides of the car body. Thus I am able to dispense with all rotative connections between the pinion 8 and the mechanism upon the far side of the car body and accomplish all necessary locking movement by a mere end thrust of the transverse connecting member.

It is to be understood that the invention is not limited to the precise arrangement shown, but that it includes within its purview whatever changes fairly come within either the terms or the spirit of the appended claim.

Having described my invention, what I claim is:

In a locking mechanism for automobiles of the type having a pair of meeting posts and pairs of doors which abut upon said posts at each side of the car body, a locking mechanism comprising a pair of vertically slidable blocks, one at each side of the car body and located in said posts, an endwise movable flexible member engaged with said blocks, key controlled means for shifting said member endwise in such manner that when the member is shifted one of said blocks will be elevated and the other will be lowered, a pair of curved volts pivotally connected to each of said blocks, the bolts of the pairs lying in crossed relation to each other, the bolts of one pair curving downwardly and outwardly beneath their supporting blocks and the bolts of the other pair curving upwardly and outwardly of their supporting blocks, as and for the purposes set forth.

HASKELL IRWIN.